United States Patent [19]
Plummer et al.

[11] Patent Number: 6,122,115
[45] Date of Patent: Sep. 19, 2000

[54] METHOD AND DEVICE FOR MOUNTING OPTICAL COMPONENTS

[75] Inventors: William T. Plummer, Concord; Jeffrey W. Roblee, Watertown; Douglas S. Goodman, Sudbury, all of Mass.

[73] Assignee: Polaroid Corporation, Cambridge, Mass.

[21] Appl. No.: 09/196,503

[22] Filed: Nov. 20, 1998

Related U.S. Application Data

[63] Continuation-in-part of application No. 08/885,260, Jun. 30, 1997, Pat. No. 6,011,577.

[51] Int. Cl.[7] ..................................................... G02B 7/02
[52] U.S. Cl. .......................... 359/822; 359/811; 359/820
[58] Field of Search ..................................... 359/811, 819, 359/820, 822; 347/259; 285/332

[56] References Cited

U.S. PATENT DOCUMENTS

| | | | |
|---|---|---|---|
| 4,738,512 | 4/1988 | Faatz et al. | 359/811 |
| 4,854,671 | 8/1989 | Hanke et al. | 359/820 |
| 5,122,909 | 6/1992 | Butler | 359/820 |
| 5,570,238 | 10/1996 | Leary | 359/820 |
| 5,576,895 | 11/1996 | Ikeda | 359/811 |
| 5,608,579 | 3/1997 | Nomura | 359/820 |
| 5,615,052 | 3/1997 | Doggett | 359/811 |
| 5,633,761 | 5/1997 | Takashima et al. | 359/811 |
| 6,011,577 | 1/2000 | Goodman et al. | 347/259 |

*Primary Examiner*—Loha Ben
*Attorney, Agent, or Firm*—Orlando Lopez

[57] ABSTRACT

An optical component mounting device and method is disclosed where the optical components are disposed within a thin-walled tube and the tube is configured to produce an interference fit within the cylindrical opening of a mounting sleeve. The optical components are secured to the tube such that their optical axes coincide with the tube longitudinal axis. Mating of the optical mounting assembly to external reference surfaces precisely locates and aligns the optical axes with respect to an external reference axis. The optical mounting assembly provides at least two degrees of freedom to the optical components for facilitating alignment.

52 Claims, 6 Drawing Sheets

METHOD AND DEVICE FOR MOUNTING OPTICAL COMPONENTS

CROSS REFERENCE TO RELATED APPLICATION

This Application is a continuation-in-part of commonly-assigned, application Ser. No. 08/885,260 filed Jun. 30, 1997, now U.S. Pat. No. 6,011,577.

BACKGROUND OF THE INVENTION

1. Field of the Invention

This invention in general relates to the field of optical assemblies and, in particular, to a method and device for mounting and aligning optical components.

2. Description of the Prior Art

In electro-optical products comprising a radiation source, such as a laser printer or a scanner, replacement of the radiation source usually requires that the optical elements used for focusing or collimation be realigned. While the relevant art discloses various methods and devices for mounting optical components, most designs do not provide for passive alignment for convenient interchangeablity of optical components. Moreover, the process of optical realignment may require specialized fixturing and, thus, make it difficult to directly replace such radiation sources in the field.

The electro-optical product may make use of a modular radiation source, such as that exemplified by U.S. Pat. No. 5,615,052 issued to Doggett which discloses a laser diode and lens assembly adapted for placement into a standard electronic package. The lens is immovably adhered to the laser diode housing after an alignment procedure has been completed. By way of another example, U.S. Pat. No. 5,633,761 issued to Takashima et al. discloses a laser diode module in which a collimating lens is secured in a mounting mechanism which allows the lens to be tilted in an alignment procedure.

Additionally, for laser optical systems in which positioning and alignment of optical components is very critical, the effects of temperature changes on the component materials becomes important. Certain optical systems, such as those exemplified by U.S. Pat. No. 5,576,895 issued to Ikeda and U.S. Pat. No. 5,570,238 issued to Leary, address this problem by suitable support geometry or by incorporating additional components having different coefficients of expansion.

While the relevant art thus describes a variety of methods and devices for mounting optical components, there remains a need for improvements that offer advantages and capabilities not found in presently available methods and devices, and it is a primary object of this invention to provide such improvements.

It is another object of the invention to provide for a method of passively aligning optical elements with an assembly component such as a radiation source or another optical element.

It is yet another object of the present invention to provide for such a method and device which uses a minimum number of components.

It is still another object of the invention to provide for such a method and device which minimizes thermal effects on the alignment of optical elements.

Other objects of the invention will be obvious, in part, and, in part, will become apparent when reading the detailed description to follow.

SUMMARY OF THE INVENTION

The present invention discloses a method and device for mounting optical elements and aligning the elements to an external reference axis. The optical mounting assembly comprises one or more optical components, a thin-walled tube with exterior radial lobes, and a mounting sleeve, the tube disposed within the cylindrical opening of the mounting sleeve with an interference fit. The optical components are secured to the tube such that their optical axes coincide with the tube longitudinal axis, and the mounting sleeve interfaces with external reference surfaces. Placement of the optical mounting assembly on the reference surfaces precisely locates and aligns the optical axes with respect to the reference axis. The optical mounting assembly provides at least two degrees of freedom to the optical components for facilitating alignment.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

Figure 1:
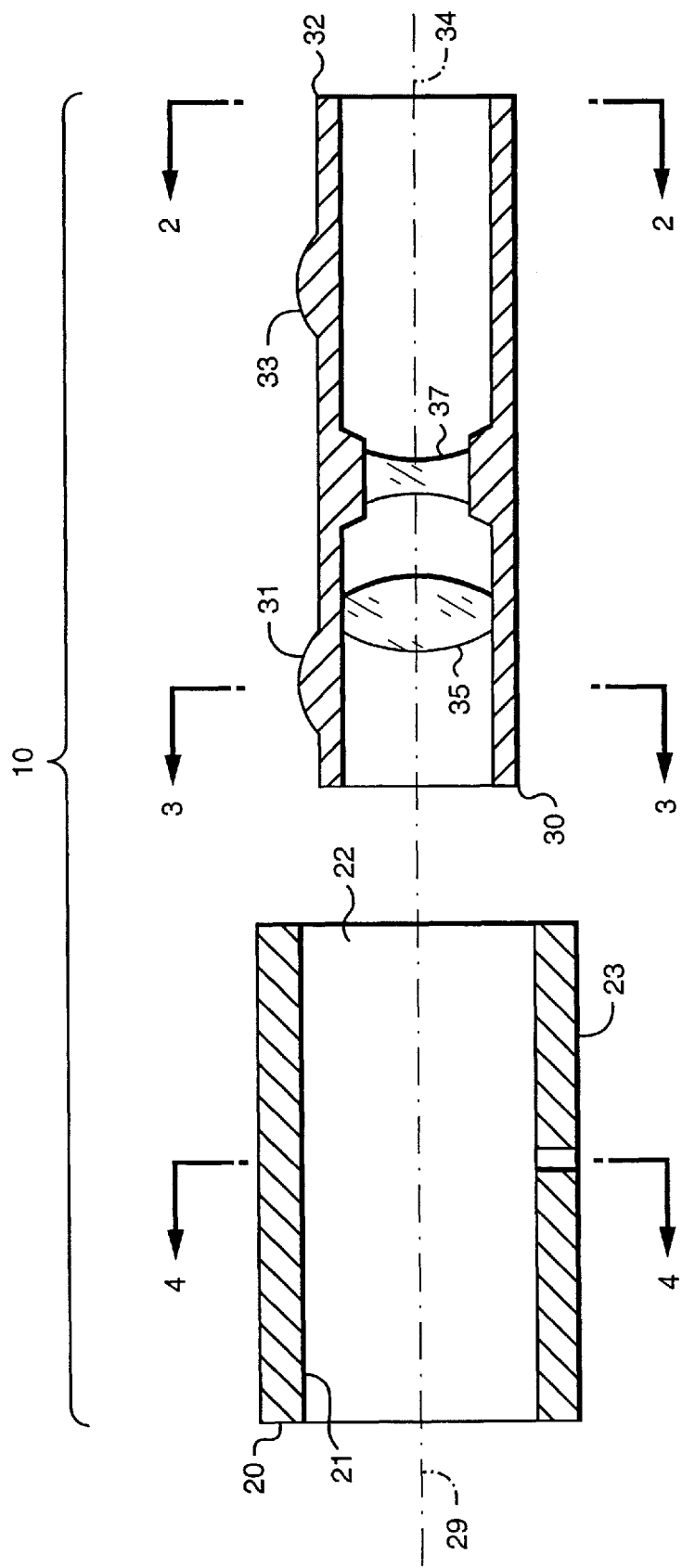
FIG. 1 is an exploded diagrammatical cross-sectional view of an optical assembly in accordance with the present invention comprising a mounting sleeve and an optical tube assembly having two sets of radial lobes.

There is shown in FIG. 1 a cross-sectional diagrammatical view of an optical mounting assembly 10, in accordance with the present invention, comprising a mounting sleeve 20 and an optical tube assembly 30 configured for installation within a sleeve opening 22 as described in greater detail below. Optical mounting assembly 10 is here shown in an unassembled configuration.

Optical tube assembly 30 preferably comprises a substantially thin-walled tube 32 within which are secured one or more reflective, refractive, or diffractive optical elements such as, by way of example, a positive lens 35 and a cylindrical lens 37. Tube 32 is of sufficient thickness to provide structural integrity to optical tube assembly 30, but sufficiently thin-walled to allow for some radial deformation, as described in greater detail below. Lenses 35 and 37 are positioned and secured within tube 32 such that the optical axis of each is coincident with a longitudinal tube axis 34 of tube 32. Tube 32 is fabricated with a set of rear radial lobes 31 and a set of front radial lobes 33. The surfaces of radial lobes 31 and 33 are preferably non-planar.

Figure 2:
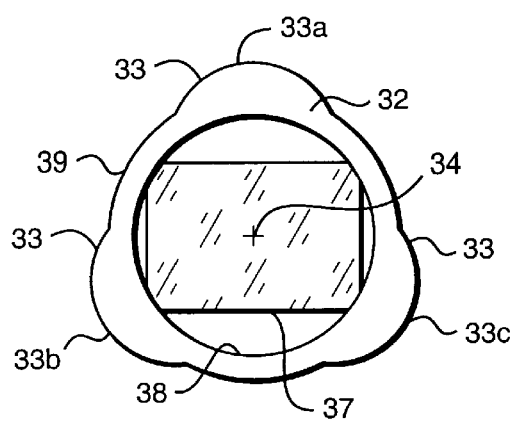
FIG. 2 is an end view of the optical tube assembly of FIG. 1.

FIG. 2 is an end view of optical tube assembly 30 showing emplacement of cylindrical lens 37 and the relative positions of three front radial lobes 33 circumferentially disposed approximately 120° apart on an exterior cylindrical surface 39 of tube 32. For an embodiment comprising more than three front (or three rear) radial lobes, the angular separations will be equal and less than 120°. Tube 32 also comprises a set of three rear radial lobes 31 (obstructed in this view by front radial lobes 33 and, thus, not shown). It should be understood that, although one set of three lobes is the required minimum quantity, additional lobes may be provided as suitable without departing from the spirit of the invention. It should also be understood that the set of three, or more, rear radial lobes 31 can be positioned as desired on exterior cylindrical surface 39 and need not be longitudinally 'in line' with front radial lobes 33.

Figure 3:
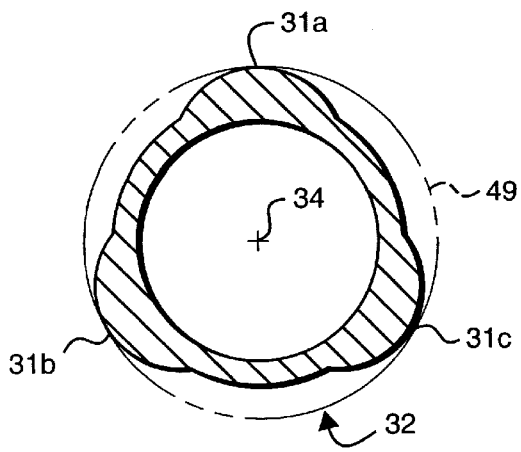
FIG. 3 is a cross-sectional view of the optical tube assembly of FIG. 1 showing one of the sets of radial lobes circumferentially-spaced on the surface of the tube.

Tube 32 is preferably fabricated by machining in a lathe such that rear lobe tips 31a, 31b, and 31c, (front lobe tips 33a, 33b, and 33c—not shown,) serve to establish tube axis 34. As best seen in FIG. 3, lobe tips 31a, 31b, 31c, 33a, 33b, and 33c lie on an external cylindrical envelope 49. An interior cylindrical surface 38 is formed to within a high degree of concentricity relative to cylindrical envelope 49. Assembly of optical tube assembly 30 is accomplished by securing lenses 35 and 37 within interior cylindrical surface 38 of tube 32, as is well understood by one skilled in the relevant art. When thus secured, the optical axes of lenses 35 and 37 are precisely positioned and aligned with respect to tube axis 34.

Radial lobes 31 and 33 are sized such that an interference fit results when optical tube assembly 30 is inserted into mounting sleeve 20. Upon insertion, lobe tips 33a, 33b, and 33c (and lobe tips 31a, 31b, and 31c) make contact with mounting sleeve 20. There is otherwise no contact between mounting sleeve 20 and exterior cylindrical surface 39. Because of the thin-walled configuration of tube 32, a certain amount of inward radial flexing will occur at the wall regions of radial lobes 31 and 33, the amount of flexing being a function of local wall thickness, material properties, and the amount of interference encountered upon insertion. But, because of the cross-sectional radial symmetry of tube 32, the relative position of tube axis 34 will not be affected by this flexing.

Figure 4:
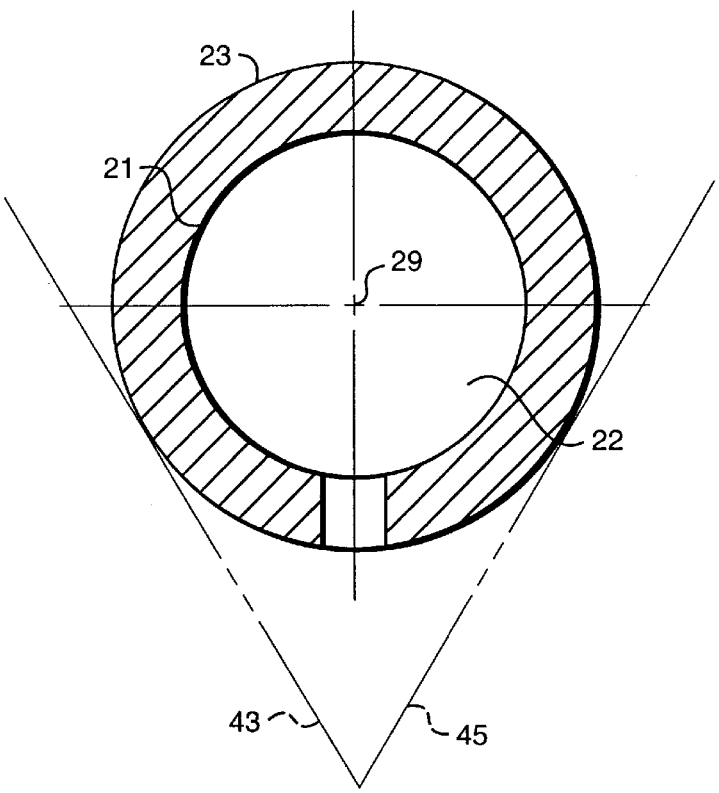
FIG. 4 is a cross-sectional view of the mounting sleeve of FIG. 1 emplaced in a groove formed by external mating surfaces, such as in a next higher assembly.

As shown in FIG. 4, mounting sleeve 20 comprises an inner cylindrical surface 21 forming sleeve opening 22 and defining a sleeve axis 29. Cylindrical surface 21 is the radial boundary of sleeve opening 22, wherein sleeve opening 22 accommodates the insertion of optical tube assembly 30. When fabricated and assembled in accordance with the present invention, emplacement of optical tube assembly 30 within mounting sleeve 20 positions and aligns tube axis 34 in coincidence with sleeve axis 29 to within a high degree of precision.

Mounting sleeve 20 further comprises an outer bearing surface 23 configured to mate with, by way of example, a first external reference surface 43 and a second external reference surface 45. External reference surfaces 43 and 45 are here shown forming a groove with a dihedral angle of about 60°, but one skilled in the relevant art will understand that other suitable reference surface angles and configurations lie within the scope of the present invention. External reference surfaces 43 and 45 represent the interface surfaces of a higher-level optical assembly, a support structure, or a mechanism (not shown) to which optical mounting assembly 10 may be secured. When mounting sleeve 20 is emplaced against external reference surfaces 43 and 45, sleeve axis 29 is precisely located and oriented within the higher-level assembly for alignment with, for example, a radiation source such as a laser diode.

Mounting sleeve 20 is preferably fabricated by machining in a lathe so as to form inner cylindrical surface 21 and outer bearing surface 23 to within a high degree of concentricity relative to one another and, accordingly, to precisely define sleeve axis 29. By providing this high degree of concentricity between surfaces 21 and 23, the location of sleeve axis 29 is assured to within a predetermined precision with respect to both external reference surfaces 43 and 45. Furthermore, because of the allowance for inward radial flexing at radial lobes 31 and 33 when tube 32 is inserted, the dimensional tolerance of the diameter of inner cylindrical surface need not be as precise as the concentricity tolerance. In a preferred embodiment, for example, concentricity tolerances are on the order of ±0.0003 inch for a tube diameter of about 0.663 inch, and the respective diameters are machined to a tolerance of about ±0.001 inch.

When mounting sleeve 20 is emplaced against external reference surfaces 43 and 45, no tilt or movement of mounting sleeve 20 occurs transverse to sleeve axis 29. Accordingly, when optical mounting assembly 10 is installed into the higher-level assembly, the alignment and relative positions of sleeve axis 29, as well as tube axis 34, are predetermined and fixed with respect to external reference surfaces 43 and 45.

Figure 5:
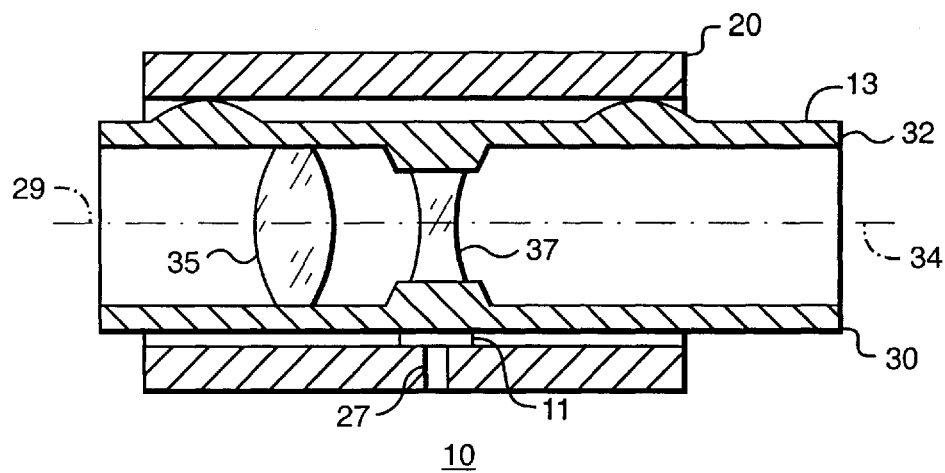
FIG. 5 is a diagrammatical cross-sectional view of the optical assembly of FIG. 1 in an assembled configuration showing an adhesive compound used to secure the optical tube assembly to the mounting sleeve.

The assembly of optical tube assembly 30 to mounting sleeve 20 is shown in FIG. 5. When installed, optical tube assembly 30 is restricted to two degrees of freedom: one translational degree of freedom along tube axis 34 and one rotational degree of freedom about tube axis 34. Optical tube assembly 30 is otherwise restrained in position. Lenses 35 and 37 can thus be positioned along and aligned about sleeve axis 29, as required, while maintaining tube axis 34 in coincidence with sleeve axis 29. Subsequent to alignment, a securing compound 11, such as an adhesive or a volume-filling substance, may be injected between optical tube assembly 30 and mounting sleeve 20 via an access hole 27.

Figure 6:
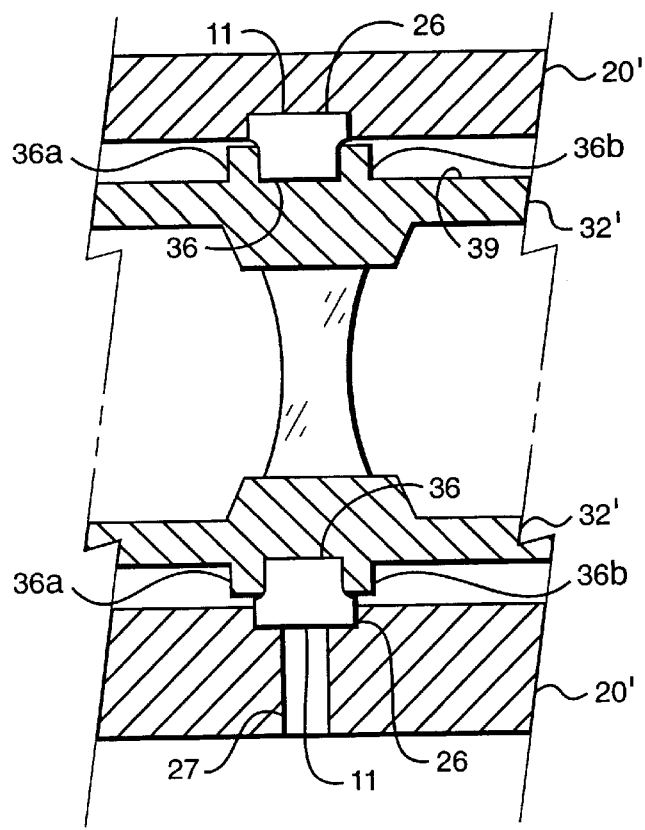
FIG. 6 is a detail view of an alternative method of securing the optical tube assembly to the mounting sleeve showing a volume-filling compound injected into opposing circumferential grooves provided on the exterior cylindrical surface of the optical tube and on the inner cylindrical surface the mounting sleeve.

In an alternative embodiment, best seen in FIG. 6, compound 11 may be retained within a raised circumferential tube channel 36 formed by parallel ridges 36a and 36b on an exterior cylindrical surface 39' of a tube 32'. Compound 11 also flows into an opposing circumferential sleeve channel 26, provided in a sleeve 20', to secure optical tube assembly 30' to mounting sleeve 20'. For reasons of clarity, channels 26 and 36 are shown only in the embodiment of FIG. 6, but it should be understood that one or more pairs of channels 26 and 36 can be used in any of the alternative embodiments of the invention disclosed herein.

The respective widths of channels 26 and 36 are such that at least a portion of tube channel 26 will be positioned adjacent to and overlapping sleeve channel 36 upon assembly of tube 32' to sleeve 20', even when lateral adjustment and assembly tolerances are taken into account. This serves to insure that injection of compound 11 via access hole 27 will produce a flow of compound 11 into both tube groove 26 and sleeve channel 36. When set, compound 11 will prevent movement of tube 32' along sleeve axis 29, yet will allow relative lateral movement between tube 32' and sleeve 20' in response to thermal effects.

It can be further appreciated by one skilled in the relevant art that, when compound 11 is used to secure optical tube assembly 30 to mounting sleeve 20, as shown in FIG. 5, thermally-induced expansion or contraction of tube 32 will cause a longitudinal displacement in the position of either or both lenses 35 and 37. This displacement can be used to advantage to compensate for thermally-induced changes in the index of refraction of lenses which result in a change in lens focal length. Compound 11 can be located such that the amount of displacement resulting from thermal effects compensates for the shift in the focal plane.

Figure 7:
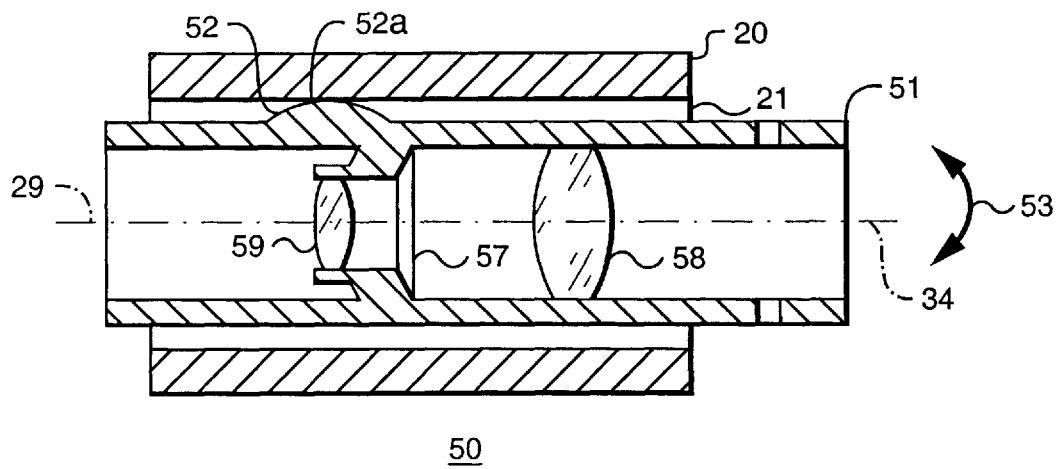
FIG. 7 is an alternative embodiment of the optical assembly of FIG. 1 comprising a single set of radial lobes and an internal collar for mounting one of the component lenses.

Optical tube assembly 30 may further comprise a handling section 13 (i.e., that portion of tube 32 protruding from mounting sleeve 20) and configured to interface with an external fixturing apparatus (not shown) when the alignment and positioning of lenses 35 and 37 is being performed. Alternatively, an optical tube assembly 51 may comprise alignment holes 55, shown in FIG. 7, for interfacing with fixturing pins. In this embodiment, an optical mounting assembly 50 comprises lenses 58 and 59, and only a single set of at least three circumferentially-spaced radial lobes 52. This configuration provides for four degrees of freedom, an additional two degrees of freedom as indicated by arrow 53, in comparison to the two degrees of freedom in the embodiment disclosed above, for applications requiring a greater correction in angular alignment.

Lens 59 is secured at the longitudinal position of radial lobes 52. This configuration allows tube 51 to be adjusted about longitudinal axis 34 in the direction of arrow 53, without longitudinally displacing lens 59 along sleeve axis 29. In this embodiment, lobe tips 52a of radial lobes 51 preferably comprise surfaces having radii of curvature, in the longitudinal meridian, approximately equal to the radius of inner cylindrical surface 21 in mounting sleeve 20. This allows for lateral rotation of optical tube assembly 51, as without affecting the position of lens 59. To enhance the flexing of optical tube assembly 51 at radial lobes 52, lens 59 may be mounted in an internal collar 57 which is offset from the location of radial lobes 51 as shown.

Figure 8:
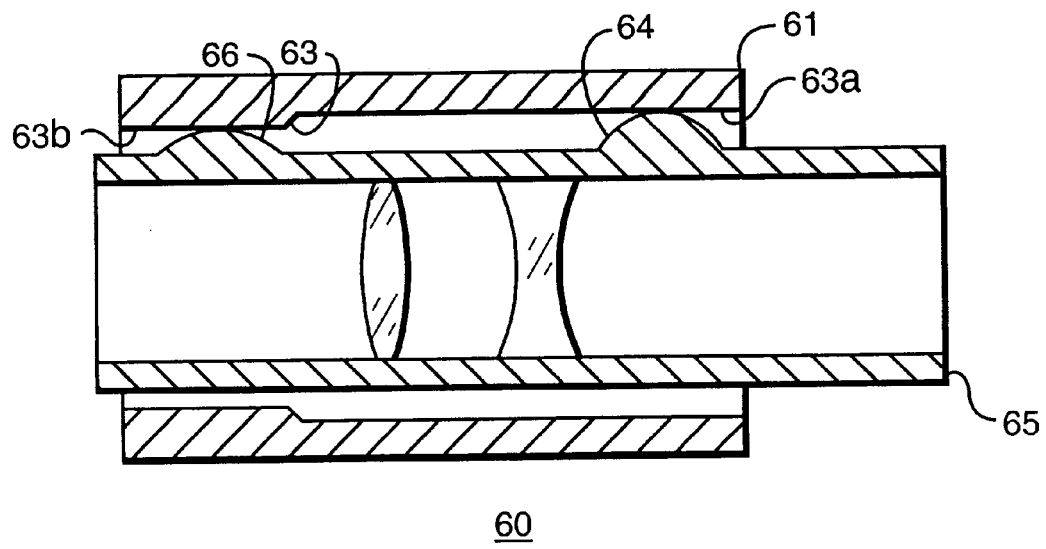
FIG. 8 is another alternative embodiment of the optical assembly of FIG. 1 comprising two sets of radial lobes of different sizes.

In yet another embodiment, shown in FIG. 8, an optical mounting assembly 60 comprises a mounting sleeve 61 and an optical tube assembly 65. Mounting sleeve 61 comprises an inner cylindrical surface 63 having a forward section 63a of slightly greater diameter than that of a rearward section 63b. Optical tube assembly 65 comprises at least three front radial lobes 64 and at least three rear radial lobes 66, where the diameter of the external cylindrical envelope of front radial lobes 64 is proportionately greater than the diameter of the external cylindrical envelope of rear radial lobes 66. This configuration allows optical tube assembly 65 to be inserted into mounting sleeve 61 without necessitating the application of an insertion force until rear radial lobes 66 make contact with rearward section 63b.

Figure 9:
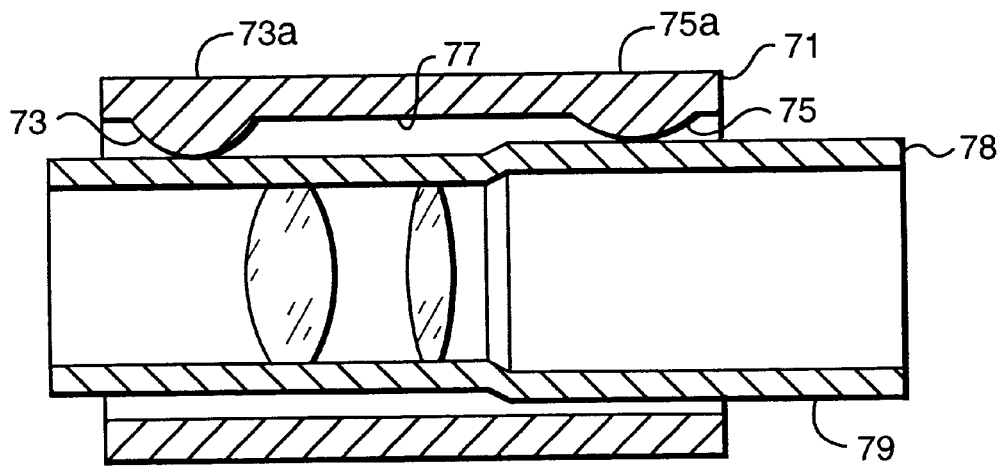
FIG. 9 is yet another embodiment of the optical assembly of FIG. 1 in which radial lobes are disposed on an inner cylindrical surface of the mounting sleeve.

In an alternate embodiment of the present invention, some or all of the radial lobes are disposed on the mounting sleeve rather than on the lens tube. There is shown in FIG. 9 an optical mounting assembly 70 comprises a mounting sleeve 71 and a tube 78 comprising an exterior cylindrical surface 79. Mounting sleeve 71 comprises at least three rear radial lobes 73 and at least three front radial lobes 75 disposed on an inner cylindrical surface 77. The dimensions of radial lobes 73 and 75 are predetermined so as to provide an interference fit when optical tube assembly 78 is placed within cylindrical surface 77.

Figure 10:
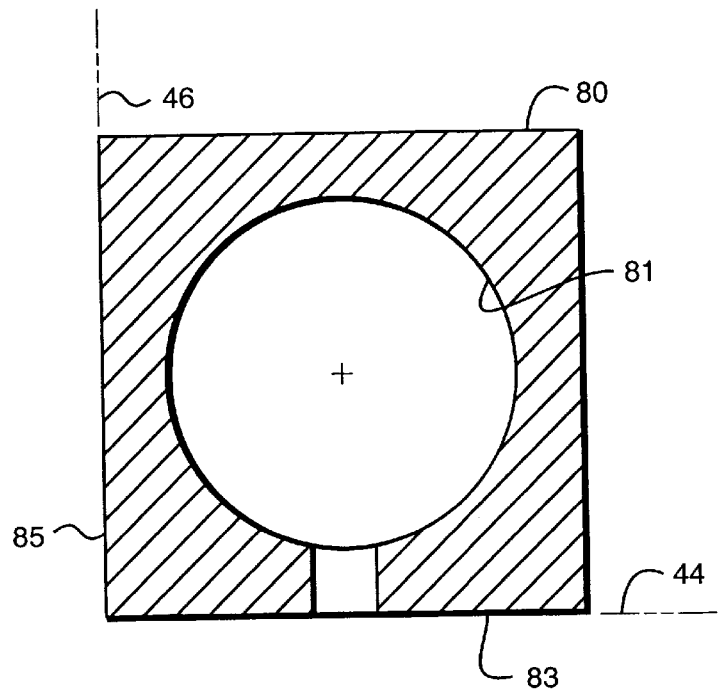
FIG. 10 is a cross-sectional view of an alternate embodiment of the mounting sleeve of FIG. 1 comprising a rectangular cross section and emplaced against two external mating surfaces.

In yet another embodiment, shown in FIG. 10, a mounting block 80, comprising a rectangular cross-sectional shape and an inner cylindrical surface 81, is used for positioning a lens tube (not shown). In this configuration, external bearing surfaces 83 and 85 of mounting block 80 interface with corresponding external reference surfaces 44 and 46 of a higher-level assembly. Preferably, the dihedral angle formed by external bearing surfaces 83 and 85 precisely conforms to the dihedral angle defined by external reference surfaces 44 and 46.

Figure 11:
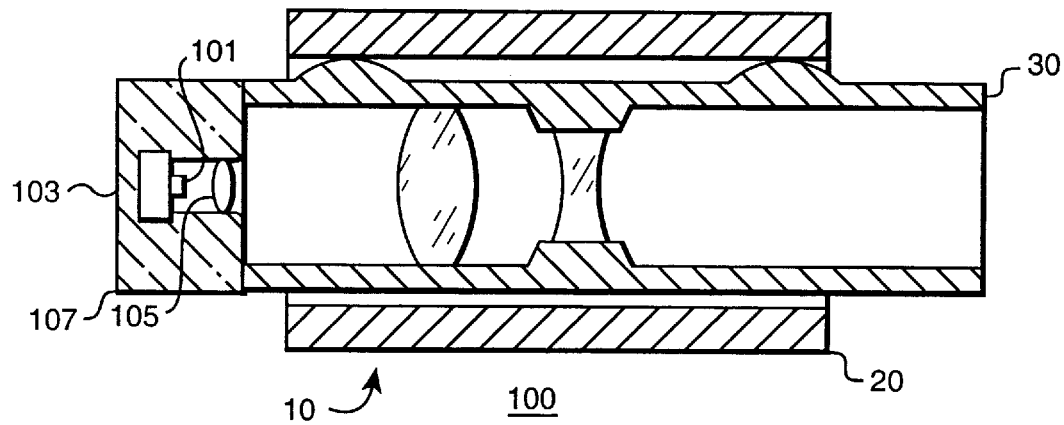
FIG. 11 shows a typical application of the present invention in a printhead comprising the optical assembly optically coupled to the output of a radiation source, such as a laser diode mounted on a heat sink, the laser diode assembly secured to the optical tube assembly; and, FIG. 12 shows an alternate configuration of the printhead of FIG. 11 comprising a laser diode assembly secured to the mounting sleeve.
Figure 12:
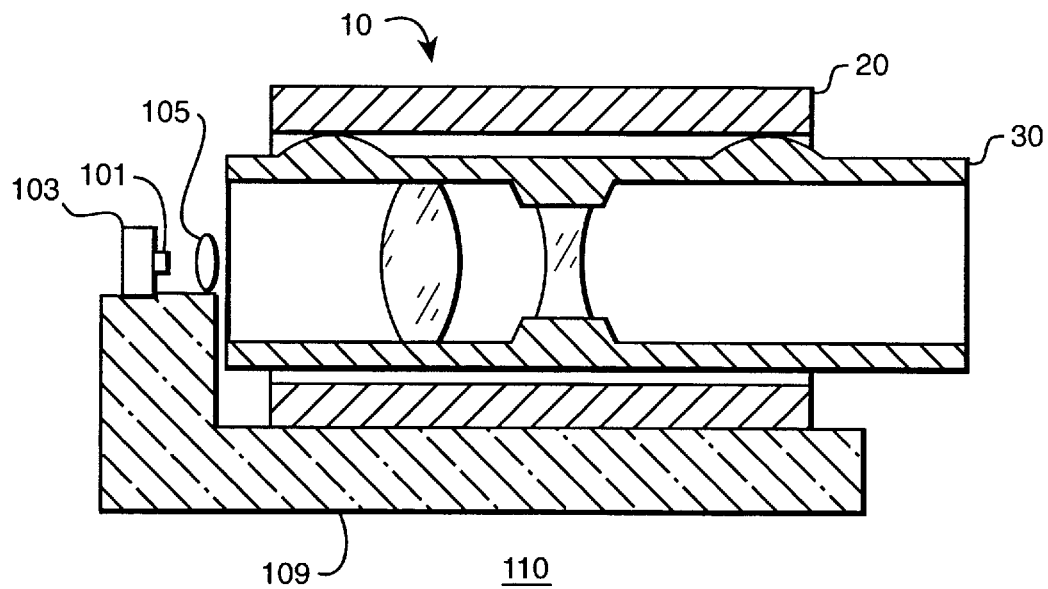

In a typical application of the present invention, shown in FIG. 11, a printhead 100 comprises optical mounting assembly 10 positioned and aligned so as to be optically coupled to the output of a radiation source 101, such as a laser diode, here shown mounted on a heat sink 103. Heat sink 103 and a collimating lens 105 are mounted in a housing 107 which is attached to optical tube assembly 30. In an alternative embodiment, shown in FIG. 12, a printhead 110 comprises heat sink 103 and collimating lens 105 secured to a base 109 upon which optical mounting assembly 10 is mounted after alignment is completed. In this embodiment, base 109 is attached to mounting sleeve 20 so as to provide for the alignment of optical tube assembly 30 relative to radiation source 101.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical mounting assembly suitable for positioning and aligning an optical element relative to a reference axis defined by an external reference surface, said optical mounting assembly comprising:

a mounting sleeve comprising an outer bearing surface, for interfacing with the external reference surface, and an inner cylindrical surface forming a sleeve opening through said mounting sleeve, said inner cylindrical surface further defining a sleeve axis, said sleeve axis positioned and aligned in coincidence with the reference axis when said outer bearing surface interfaces with the external reference surface;

a tube disposed within said sleeve opening, said tube comprising an exterior cylindrical surface, a first set of at least three radial lobes disposed upon said exterior cylindrical surface, and a second set of at least three radial lobes disposed upon said exterior cylindrical surface between said first set of radial lobes and an end of said tube, each said radial lobe comprising a lobe tip whereby said lobe tips define both an external cylindrical envelope and an enclosed tube axis, said external cylindrical envelope having a diameter greater than the diameter of said sleeve opening such that an interference fit is produced between said radial lobes and said mounting sleeve when said tube is inserted into said sleeve opening along said sleeve axis, said tube further comprising an interior cylindrical surface concentric with said external cylindrical envelope; and, at least one optical element secured to said tube and disposed within said interior cylindrical surface such that an optical axis of said optical element is positioned and aligned in coincidence with said tube axis and, further, such that said optical axis is thereby positioned and aligned with the reference axis when said outer bearing surface interfaces with the external reference surface.

2. The optical mounting assembly of claim 1 wherein said outer bearing surface comprises a cylindrical surface.

3. The optical mounting assembly of claim 2 wherein said inner cylindrical surface is concentric to within a first predetermined precision relative to said outer bearing surface.

4. The optical mounting assembly of claim 3 wherein a diameter of said inner cylindrical surface is formed to within a second predetermined precision, said second predetermined precision being greater than said first predetermined precision.

5. The optical mounting assembly of claim 1 wherein said outer bearing surface comprises two planar surfaces forming a dihedral angle.

6. The optical assembly of claim 1 wherein said tube comprises a substantially thin-walled cylinder.

7. The optical assembly of claim 1 wherein said first set of radial lobes is distributed circumferentially about said tube.

8. The optical assembly of claim 7 wherein said radial lobes have an angular separation of no more than 120°.

9. The optical mounting assembly of claim 1 wherein said interior cylindrical surface is concentric to within a first predetermined precision relative to said external cylindrical envelope.

10. The optical mounting assembly of claim 9 wherein said external cylindrical envelope diameter is formed to within a second predetermined precision, said second predetermined precision having a greater dimensional tolerance than said first predetermined precision.

11. The optical assembly of claim 1 further comprising means for securing said tube to said mounting sleeve such that relative movement between said tube and said mounting sleeve is restricted.

12. The optical assembly of claim 11 wherein said means for securing comprises an adhesive.

13. The optical assembly of claim 11 wherein said means for securing comprises a volume-filling compound.

14. The optical assembly of claim 1 wherein said mounting sleeve comprises a circumferential channel.

15. The optical assembly of claim 1 wherein said tube comprises a circumferential channel.

16. An optical mounting assembly suitable for positioning and aligning an optical element relative to a reference axis defined by an external reference surface, said optical mounting assembly comprising:

a mounting sleeve comprising an outer bearing surface, for interfacing with the external reference surface, and an inner cylindrical surface forming a sleeve opening through said mounting sleeve, said inner cylindrical surface further defining a sleeve axis, said sleeve axis positioned and aligned in coincidence with the reference axis when said outer bearing surface interfaces with the external reference surface;

a tube disposed within said sleeve opening, said tube comprising an exterior cylindrical surface and at least three radial lobes disposed upon said exterior cylindrical surface, each said radial lobe comprising a lobe tip whereby said lobe tips define both an external cylindrical envelope and an enclosed tube axis, said external cylindrical envelope having a diameter greater than the diameter of said sleeve opening such that that an interference fit is produced between said radial lobes and said mounting sleeve when said tube is inserted into said sleeve opening along said sleeve axis, said tube further comprising an interior cylindrical surface concentric with said external cylindrical envelope; and, at least one optical element secured to said tube and disposed within said interior cylindrical surface such that an optical axis of said optical element is positioned and aligned in coincidence with said tube axis and, further, such that said optical axis is thereby positioned and aligned with the reference axis when said outer bearing surface interfaces with the external reference surface.

17. The optical mounting assembly of claim 16 wherein said outer bearing surface comprises a cylindrical surface.

18. The optical mounting assembly of claim 16 wherein said outer bearing surface comprises two planar surfaces forming a dihedral angle.

19. The optical assembly of claim 16 wherein said tube comprises a substantially thin-walled cylinder.

20. The optical assembly of claim 16 wherein said radial lobes are distributed circumferentially about said tube.

21. An optical mounting assembly suitable for positioning and aligning an optical element relative to a reference axis defined by an external reference surface, said optical mounting assembly comprising:

a mounting sleeve comprising an outer bearing surface, for interfacing with the external reference surface, a first inner cylindrical surface, and a second inner cylindrical surface having a diameter greater than the diameter of said first inner cylindrical surface, said cylindrical surfaces forming a sleeve opening through said mounting sleeve, said inner cylindrical surfaces further defining a sleeve axis, said sleeve axis positioned and aligned in coincidence with the reference axis when said outer bearing surface interfaces with the external reference surface;

a tube disposed within said sleeve opening, said tube comprising an exterior cylindrical surface, a first set of at least three radial lobes disposed upon said exterior cylindrical surface, and a second set of at least three radial lobes disposed upon said exterior cylindrical surface between said first set of radial lobes and an end of said tube, each said radial lobe comprising a lobe tip whereby said first set of lobe tips defines a first external cylindrical envelope and an enclosed tube axis and said second set of lobe tips defines a second external cylindrical envelope having a diameter greater than the diameter of said first external cylindrical envelope, said first external cylindrical envelope having a diameter greater than the diameter of said first inner cylindrical surface and said second external cylindrical envelope having a diameter greater than the diameter of said second inner cylindrical surface such that an interference fit is produced between said radial lobes and said mounting sleeve when said tube is inserted into said sleeve opening along said sleeve axis, said tube further comprising an interior cylindrical surface concentric with said external cylindrical envelopes; and, at least one optical element secured to said tube and disposed within said interior cylindrical surface such that an optical axis of said optical element is positioned and aligned in coincidence with said tube axis and, further, such that said optical axis is thereby positioned and aligned with the reference axis when said outer bearing surface interfaces with the external reference surface.

22. The optical mounting assembly of claim 21 wherein said outer bearing surface comprises a cylindrical surface.

23. The optical mounting assembly of claim 22 wherein said first inner cylindrical surface is concentric to within a first predetermined precision relative to said outer bearing surface.

24. The optical mounting assembly of claim 23 wherein said first inner cylindrical surface diameter is formed to within a second predetermined precision, said second predetermined precision being greater than said first predetermined precision.

25. The optical mounting assembly of claim 21 wherein said outer bearing surface comprises two planar surfaces forming a dihedral angle.

26. The optical assembly of claim 21 wherein said tube comprises a substantially thin-walled cylinder.

27. The optical assembly of claim 21 wherein said first set of radial lobes is distributed circumferentially about said tube.

28. The optical assembly of claim 27 wherein said radial lobes have an angular separation of no more than 120°.

29. The optical mounting assembly of claim 21 wherein said interior cylindrical surface is concentric to within a first predetermined precision relative to said first external cylindrical envelope.

30. The optical mounting assembly of claim 29 wherein said first external cylindrical envelope diameter is formed to within a second predetermined precision, said second predetermined precision having a greater dimensional tolerance than said first predetermined precision.

31. The optical assembly of claim 21 further comprising means for securing said tube to said mounting sleeve such that relative movement between said tube and said mounting sleeve is restricted.

32. The optical assembly of claim 21 wherein said means for securing comprises an adhesive.

33. The optical assembly of claim 21 wherein said means for securing comprises a volume-filling compound.

34. The optical assembly of claim 21 wherein said mounting sleeve comprises a circumferential channel.

35. The optical assembly of claim 21 wherein said tube comprises a circumferential channel.

36. An optical mounting assembly suitable for positioning and aligning an optical element relative to a reference axis defined by an external reference surface, said optical mounting assembly comprising:

a mounting sleeve comprising an outer bearing surface for interfacing with the external reference surface, an inner cylindrical surface forming a sleeve opening through said mounting sleeve, a first set of at least three radial lobes disposed upon said inner cylindrical surface, and a second set of at least three radial lobes disposed upon said inner cylindrical surface between said first set of radial lobes and an end of said inner cylindrical surface, each said radial lobe comprising a lobe tip whereby said lobe tips define both an internal cylindrical envelope and a sleeve axis within said internal cylindrical envelope, said sleeve axis positioned and aligned in coincidence with the reference axis when said outer bearing surface interfaces with the external reference surface;

a tube disposed within said sleeve opening, said tube comprising an exterior cylindrical surface having a diameter greater than the diameter of said internal cylindrical envelope such that an interference fit is produced between said radial lobes and said tube when said tube is inserted into said sleeve opening along said sleeve axis, said tube further comprising an interior cylindrical surface concentric with said exterior cylindrical surface; and, at least one optical element secured to said tube and disposed within said interior cylindrical surface such that an optical axis of said optical element is positioned and aligned in coincidence with an axis of said tube and, further, such that said optical axis is thereby positioned and aligned with the reference axis when said outer bearing surface interfaces with the external reference surface.

37. The optical mounting assembly of claim 36 wherein said outer bearing surface comprises a cylindrical surface.

38. The optical mounting assembly of claim 37 wherein said internal cylindrical envelope is concentric to within a first predetermined precision relative to said outer bearing surface.

39. The optical mounting assembly of claim 38 wherein said internal cylindrical envelope diameter is formed to within a second predetermined precision, said second predetermined precision having a greater dimensional tolerance than said first predetermined precision.

40. The optical assembly of claim 36 wherein said tube comprises a substantially thin-walled cylinder.

41. The optical assembly of claim 36 further comprising means for securing said tube to said mounting sleeve such that relative movement between said tube and said mounting sleeve is restricted.

42. An optical mounting assembly suitable for positioning and aligning an optical element relative to a reference axis defined by an external reference surface, said optical mounting assembly comprising:

a mounting sleeve comprising an outer bearing surface for interfacing with the external reference surface, and an inner cylindrical surface forming a sleeve opening through said mounting sleeve, and at least three radial lobes disposed upon said inner cylindrical surface, each said radial lobe comprising a lobe tip whereby said lobe tips define both an internal cylindrical envelope and a sleeve axis within said internal cylindrical envelope, said sleeve axis positioned and aligned in coincidence with the reference axis when said outer bearing surface interfaces with the external reference surface;

a tube disposed within said sleeve opening, said tube comprising an exterior cylindrical surface having a diameter greater than the diameter of said internal cylindrical envelope such that an interference fit is produced between said radial lobes and said tube when said tube is inserted into said sleeve opening along said sleeve axis, said tube further comprising an interior cylindrical surface concentric with said exterior cylindrical surface; and, at least one optical element secured to said tube and disposed within said interior cylindrical surface such that an optical axis of said optical element is positioned and aligned in coincidence with an axis of said tube and, further, such that said optical axis is thereby positioned and aligned with the reference axis when said outer bearing surface interfaces with the external reference surfaces.

43. The optical mounting assembly of claim 42 wherein said outer bearing surface comprises a cylindrical surface.

44. The optical assembly of claim 42 wherein said tube comprises a substantially thin-walled cylinder.

45. The optical assembly of claim 42 further comprising means for securing said tube to said mounting sleeve such that relative movement between said tube and said mounting sleeve is restricted.

46. An optical mounting assembly suitable for positioning and aligning an optical element relative to a reference axis defined by an external reference surface, said optical mounting assembly comprising:

a mounting sleeve comprising an outer bearing surface for interfacing with the external reference surface, a first inner cylindrical surface, and a second inner cylindrical surface having a diameter greater than the diameter of said first inner cylindrical surface, said cylindrical surfaces forming an opening through said mounting sleeve, a first set of at least three radial lobes disposed upon said first inner cylindrical surface, and a second set of at least three radial lobes disposed upon said second inner cylindrical surface, each said radial lobe comprising a lobe tip whereby said first set of lobe tips defines a first internal cylindrical envelope, and said second set of lobe tips defines a second internal cylindrical envelope, said internal cylindrical envelopes defining a sleeve axis, said sleeve axis positioned and aligned in coincidence with the reference axis when said outer bearing surface interfaces with the external reference surface;

a tube disposed within said sleeve opening, said tube comprising a first exterior cylindrical surface having a diameter greater than the diameter of said first internal cylindrical envelope, and a second exterior cylindrical surface having a diameter greater than the diameter of said second internal cylindrical envelope, such that an interference fit is produced between said radial lobes and said tube when said tube is inserted into said sleeve opening along said sleeve axis, said tube further comprising an interior cylindrical surface concentric with said exterior cylindrical surfaces; and, at least one optical element secured to said tube and disposed within said interior cylindrical surface such that an optical axis of said optical element is positioned and aligned in coincidence with an axis of said tube and, further, such that said optical axis is thereby positioned and aligned with the reference axis when said outer bearing surface interfaces with the external reference surface.

47. The optical mounting assembly of claim 46 wherein said outer bearing surface comprises a cylindrical surface.

48. The optical assembly of claim 46 wherein said tube comprises a substantially thin-walled cylinder.

49. A method for mounting optical components and aligning their optical axes to a reference axis, the reference axis defined by an external reference surface, said method comprising the steps of:

mounting the optical elements within an essentially thin-walled tube comprising radial lobes, the tips of said radial lobes defining a cylindrical envelope and a longitudinal tube axis, the optical axes coincident with the tube axis;

inserting said tube into a mounting sleeve comprising a cylindrical opening and an outer bearing surface, said opening defining a longitudinal sleeve axis;

emplacing said tube within said opening such that said tube contacts said mounting sleeve at the tips of said radial lobes so as to produce an interference fit;

mating said mounting sleeve to the external reference surface; and, positioning said optical elements by moving said optical elements along said sleeve axis and aligning said optical elements by rotating said optical elements about said sleeve axis.

50. The method of claim 49 further comprising the step of injecting a compound into said mounting sleeve so as to secure said tube to said mounting sleeve subsequent to said step of positioning and aligning said optical elements.

51. A method for mounting optical components and aligning their optical axes to a reference axis, the reference axis defined by an external reference surface, said method comprising the steps of:

mounting the optical elements within an essentially thin-walled tube, the optical axes coincident with a longitudinal axis of said tube;

inserting said tube into a mounting sleeve comprising a cylindrical opening and an outer bearing surface, said cylindrical opening comprising radial lobes, the tips of said radial lobes defining a cylindrical envelope and a longitudinal sleeve axis;

emplacing said tube within said opening such that said mounting sleeve contacts said tube at the tips of said radial lobes so as to produce an interference fit;

mating said mounting sleeve to the external reference surface; and, positioning said optical elements by moving said optical elements along said sleeve axis and aligning said optical elements by rotating said optical elements about said sleeve axis.

52. The method of claim 51 further comprising the step of injecting a compound into said mounting sleeve so as to secure said tube to said mounting sleeve subsequent to said step of positioning and aligning said optical elements.

* * * * *